US012705718B2

(12) United States Patent
Srinivasan et al.

(10) Patent No.: US 12,705,718 B2
(45) Date of Patent: Aug. 11, 2026

(54) SIMULTANEOUS CONTRAST BASED PICTURE QUALITY IMPROVEMENT FOR POWER SAVING

(71) Applicant: Samsung Electronics Co., Ltd., Suwon-si (KR)

(72) Inventors: Aparajith Srinivasan, Irvine, CA (US); Chenguang Liu, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 18/670,488

(22) Filed: May 21, 2024

(65) Prior Publication Data

US 2025/0173847 A1 May 29, 2025

Related U.S. Application Data

(60) Provisional application No. 63/603,401, filed on Nov. 28, 2023.

(51) Int. Cl.
*G06T 5/94* (2024.01)
*G06T 7/13* (2017.01)
*G06T 7/136* (2017.01)

(52) U.S. Cl.
CPC .................. *G06T 5/94* (2024.01); *G06T 7/13* (2017.01); *G06T 7/136* (2017.01)

(58) Field of Classification Search
CPC .... G06T 5/90; G06T 5/94; G06T 7/13; G06T 7/136; G06T 2207/20021
USPC .............. 345/77, 617; 382/128, 199; 430/30
See application file for complete search history.

(56) References Cited

U.S. PATENT DOCUMENTS 5,541,028 A * 7/1996 Lee .......................... G03C 5/02 430/30
6,094,508 A * 7/2000 Acharya ................... G06T 7/12 382/199
7,529,422 B2 5/2009 Wang et al.
10,217,197 B2 2/2019 Mantiuk et al.
11,049,438 B2 6/2021 Drzaic
2011/0069089 A1* 3/2011 Kopf .................... G09G 3/3208 345/77
2011/0141367 A1* 6/2011 Higuchi ................... H04N 5/58 348/602
2012/0269425 A1* 10/2012 Marchesotti ......... G06V 10/993 382/162
2014/0063074 A1* 3/2014 Drzaic ..................... G09G 3/30 345/690
2014/0333649 A1* 11/2014 Tatsumi ............... G09G 3/2092 345/589
2016/0199649 A1* 7/2016 Barnes ...................... G06T 7/11 382/128

(Continued)

FOREIGN PATENT DOCUMENTS

CN 116862811 A 10/2023
CN 117291888 A 12/2023

*Primary Examiner* — Prabodh M Dharia
(74) *Attorney, Agent, or Firm* — Sherman IP LLP; Kenneth L. Sherman; Steven Laut

(57) ABSTRACT

One embodiment provides a computer-implemented method that includes receiving an input image associated with a media content item. Gradient detection is performed to determine one or more outlines for the input image. Based on the one or more outlines, a perceived contrast associated with the input image is enhanced.

20 Claims, 11 Drawing Sheets
(7 of 11 Drawing Sheet(s) Filed in Color)

(56) References Cited

U.S. PATENT DOCUMENTS

2017/0337868 A1* 11/2017 Drzaic ................. G09G 3/3283
2018/0122054 A1* 5/2018 Baek ......................... G06T 7/12
2020/0043138 A1* 2/2020 Chou ........................ G06T 7/90
2022/0130051 A1* 4/2022 Bhatt ...................... G06T 7/168

* cited by examiner

```
filter                    = 3x3 filter to obtain the patch intensity
highlight_level           = [high, low]
Loop through image height (i)
    Loop through image width (j)
        patch             = get 3x3 maxRGB patch
        patch_intensity = sum(patch * filter) //intensity of patch
        outline(i,j)      = 1 + step(mean_gray, patch_intensity, highlight_level)*gradient(i,j)
```

```
thresh_grad     = thresh_grad * (1 – gradient(thresh_grad))
thresh_grad     = mean_filter(thresh_grad)
```

FIG. 9

```
for pixel x in the L* channel
   normalize I(x) based on median_map(x) //I is the intensity
   if I(x) < median_map(x), then factor = - contrast_factor_map(x)
   else factor = contrasr_factor_map(x)
   I(x) = f(I(x), 1 + factor)
```

FIG. 10

SIMULTANEOUS CONTRAST BASED PICTURE QUALITY IMPROVEMENT FOR POWER SAVING

CROSS-REFERENCE TO RELATED APPLICATIONS

This application claims the priority benefit of U.S. Provisional Patent Application Ser. No. 63/603,401, filed on Nov. 28, 2023, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to display imaging enhancement, and in particular, to providing enhancement of perceived contrast associated with an input image.

BACKGROUND

Power and energy conservation are crucial in today's world as we rely heavily on non-renewable energy. In addition, saving power is also key in reducing the overall electricity costs in rural and urban settings. Nowadays, almost everyone has a television (TV) or mobile phone, and one of the main components in these devices that contributes to power consumption is the display. With different types of displays such as Organic light emitting diode (OLED), Quantum dot LED (QLED) and so on emerging in the imaging space, one is able to witness crystal clear images with super high resolutions. Advancements in image processing has led to various enhancement techniques, which make the image vivid with high contrast as well. Many of these, however, have also led to increase in power consumption with the tradeoff in viewing better images. The most naïve way to save power is to reduce the backlight of the TV, but this is not visually appealing.

SUMMARY

One embodiment provides a computer-implemented method that includes receiving an input image associated with a media content item. Gradient detection is performed to determine one or more outlines for the input image. Based on the one or more outlines, a perceived contrast associated with the input image is enhanced.

Another embodiment includes a non-transitory processor-readable medium that includes a program that when executed by a processor provides enhancement of perceived contrast associated with an input image that includes receiving, by the processor, an input image associated with a media content item. The processor further performs gradient detection to determine one or more outlines for the input image. The processor additionally enhances, based on the one or more outlines, a perceived contrast associated with the input image.

Still another embodiment provides an apparatus that includes a memory storing instructions, and at least one processor executes the instructions including a process configured to receive an input image associated with a media content item. The process further performs gradient detection to determine one or more outlines for the input image. The process additionally enhances, based on the one or more outlines, a perceived contrast associated with the input image.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which:

FIG. 9 illustrates an example pseudocode for smoothing of a threshold map, according to some embodiments;

FIG. 10 illustrates an example pseudocode for enhancement of pixels in a channel based on the values from both a contrast factor map and a median map, according to some embodiments;

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

Some embodiments relate generally to display imaging enhancement, and in particular to providing enhancement of perceived contrast associated with an input image. One embodiment provides a computer-implemented method that includes receiving an input image associated with a media content item. Gradient detection is performed to determine one or more outlines for the input image. Based on the one or more outlines, a perceived contrast associated with the input image is enhanced.

One or more embodiments provide outline-based enhancement, based on gradient computation for determining edges, to model the Bartleson-Breneman (BB) effect. The disclosed technology provides a process/algorithm to enhance the picture quality (PQ) based on simultaneous contrast and models the BB Effect and provides local median-based patch processing to improve the BB effect in the output image. Some embodiments provide a model for simultaneous contrast for PQ improvement, based on outline-based enhancement and final contrast correction, while preserving or reducing power consumption. The disclosed technology provides a method for PQ improvement while preserving/reducing power consumption at the same time.

Figure 1C:
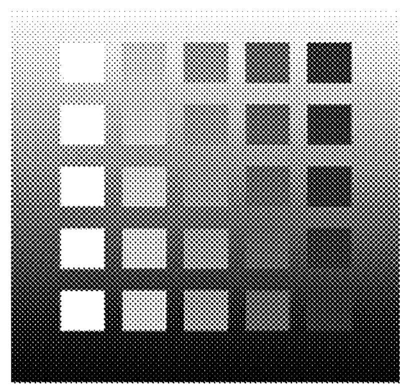
FIG. 1C illustrates an example of a Bartleson-Breneman effect (BB effect)
Figure 1B:
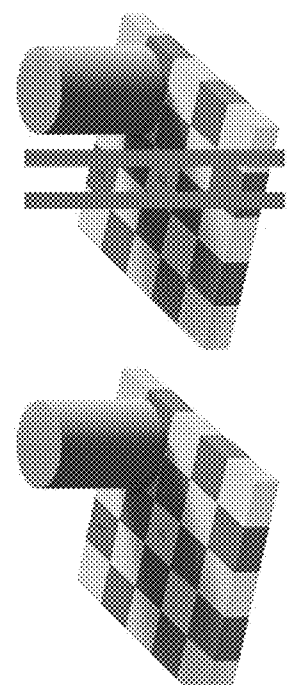
FIG. 1B illustrates an example of a checkerboard illusion.
Figure 1A:
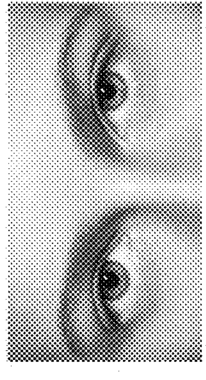
FIG. 1A illustrates a simultaneous contrast with eyeliner.
Figure 1A:
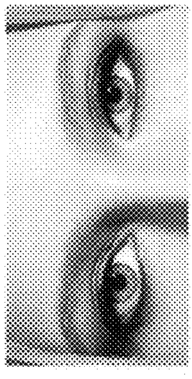

FIG. 1A illustrates a simultaneous contrast with eyeliner. FIG. 1B illustrates an example of a checkerboard illusion. FIG. 1C illustrates an example of a BB effect. Simultaneous Contrast (SC) is a visual perception phenomenon that refers to the way in which two different colors affect each other. Human eyes are designed to perceive differences. For example, for survival, it is much more important to distinguish a lion in the middle of savannah, than it is to be able to appreciate two identical yellow hues. In FIG. 1A, the eyes "pop out" more due to the contrast difference produced due to the eye liner. In FIG. 1B, the checkerboard illusion, even though letters A and B have the same intensity (as shown in the right image with the two vertical bars), the letter B looks clear due to its background. The BB Effect also explains this as shown in the example of FIG. 1C where the boxes in each row have exactly the same intensity, but the perceived intensity is different due to differences in the surroundings. Looking at the overall image, the perceived contrast is also increased. In some embodiments, the disclosed technology can include (i.e., but is not limited to) an approach/process/algorithm to enhance the PQ based on SC and the BB Effect.

Figure 2C:
FIG. 2C illustrates an example of a power saving image with the PQ reduced from the input image of FIG. 2A.
Figure 2B:
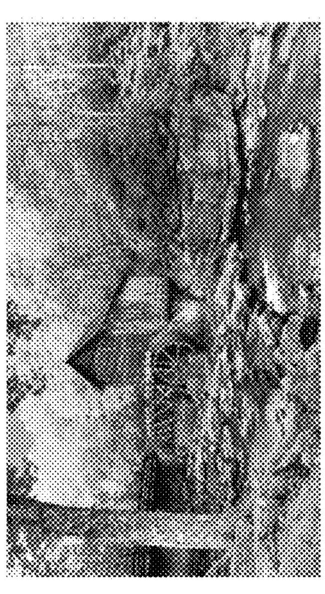
FIG. 2B illustrates an example picture quality (PQ) improved image that consumes more power than the input image of FIG. 2A.
Figure 2A:
FIG. 2A illustrates an example input image.

FIG. 2A illustrates an example input image. FIG. 2B illustrates an example PQ improved image that consumes more power than the input image of FIG. 2A. FIG. 2C illustrates an example of a power saving image with the PQ reduced from the input image of FIG. 2A. PQ improvement and power conservation are two contradictory tasks in most cases. As shown in the example of FIG. 2B, enhancing the input image can make the image brighter, which leads to more power consumption. On the other hand, in the example of FIG. 2C, the power is saved with a dimmed image, but the quality is reduced. In some embodiments, the disclosed technology can find a middle ground in PQ improvement by preserving and/or reducing the power consumption at the same time.

Figure 3:
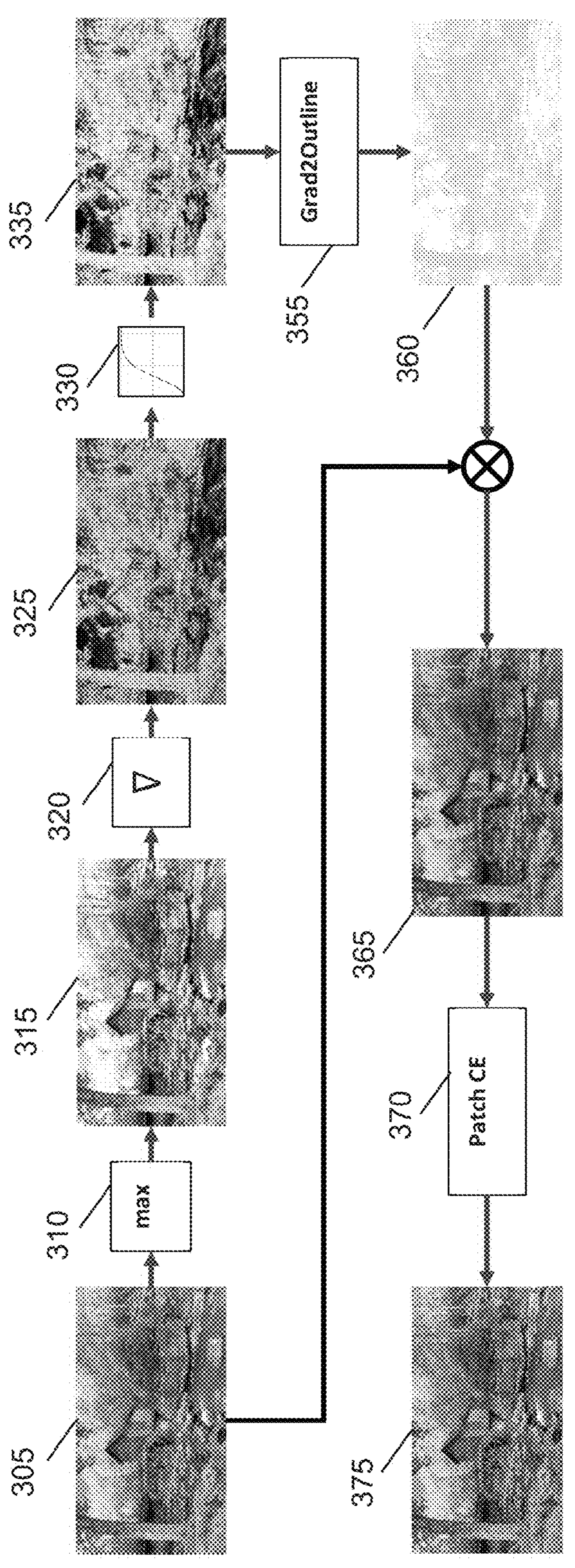
FIG. 3 illustrates an overview of a simultaneous contrast-based power saving PQ flow diagram, according to some embodiments.

FIG. 3 illustrates an overview of a simultaneous contrast-based power saving PQ flow diagram, according to some embodiments. As shown, the input image 305 is processed by maximum (max) processing 310 utilizing a maxRGB (maximum red, green, blue) function resulting in a maxRGB image 315. The maxRGB image 315 is processed by image gradient processing 320 resulting in a gradient image 325. An image gradient is a directional change in the intensity or color in an image. The gradient image 325 is input to enhancement processing 330 resulting in an enhanced gradient image 335. The enhanced gradient image 335 is input to a gradient-to-outline (Grad2Outline) function processing 355 (see FIG. 6). The outline 360 (generated by the Grad2Outline function processing 355) is combined with the input image 305 resulting in an output image 365. Gradients can provide the high intensity changes in images, and these can be predominantly the edges. Edges can act like image outlines and can be added to the input image in order to make the object pop up and increase the perceived contrast (BB Effect). A final enhancement (contrast enhancement (CE) patch (CE enhancement with patch information) processing 370) can reinforce the BB effect and increase the global contrast of the resulting enhanced output image 375. In some embodiments, the disclosed technology does not require any high-power consuming learning-based methods and can rely (e.g., can rely solely) on methods (e.g., some basic methods) such as gradient computation.

Figure 4:
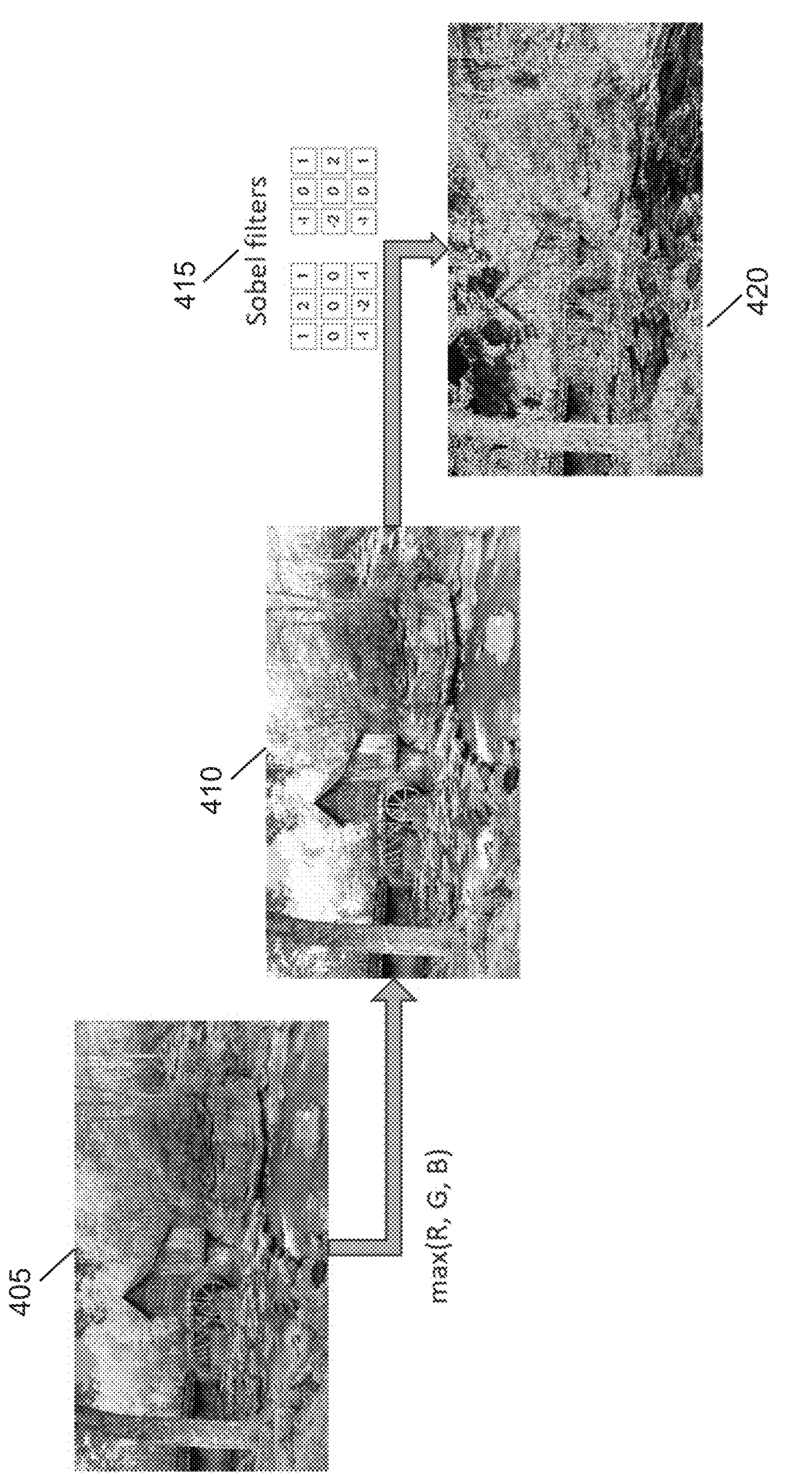
FIG. 4 illustrates a process flow for determining gradients, according to some embodiments.

FIG. 4 illustrates a process flow for determining gradients, according to some embodiments. In one or more embodiments, a maxRGB function (max processing 310, FIG. 3) is utilized on the input image 405 instead of grayscale (average) as grayscale processing produces thicker edges. Before gradient computation, the maxRGB image 410 is optionally sharpened. The algorithm/process works on getting the outlines, which can be performed using any edge detection methods (e.g., Canny edge detector, etc.). However, due to a lot of post processing in such methods, there are a lot of discontinuous edges which may not be suitable as outlines. Therefore, in some embodiments regular Sobel filters 415 are utilized to compute the gradient and use the output as a base outline for the resulting image 420. The gradient can then be clipped to the range [0, 1]. Normalization can be an alternative, but it reduces the overall intensity of the image.

Figure 5:
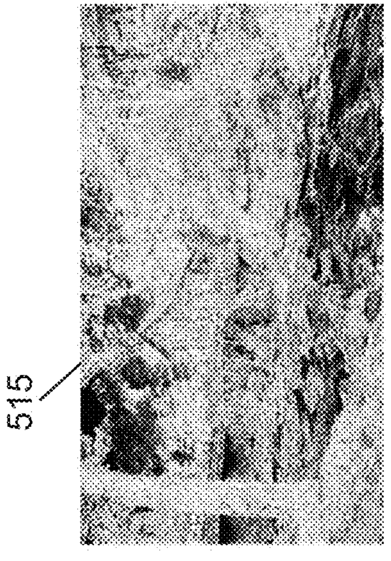
FIG. 5 illustrates an example flow for gradient enhancement, according to some embodiments.
Figure 5:
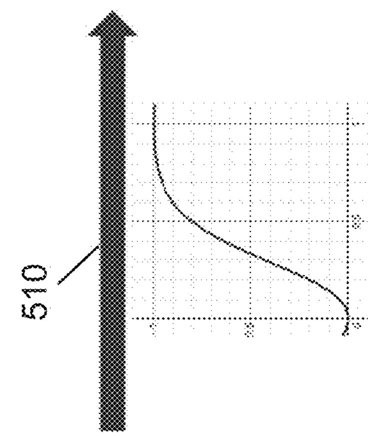
Figure 5:
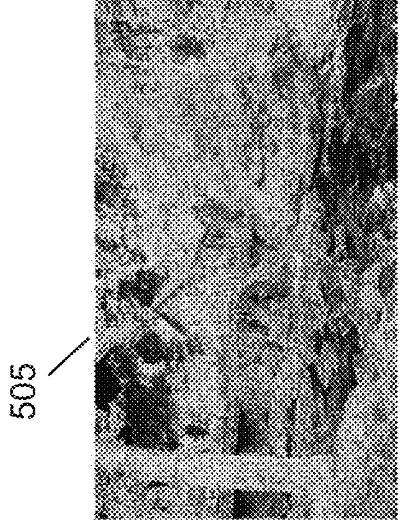

FIG. 5 illustrates an example flow for gradient enhancement, according to some embodiments. The clipped gradient image 505 can be passed through an S-shaped non-linear activation function 510 for enhancement resulting in the enhanced image 515. The activation function 510 can be represented by the following equation:

$$f(x) = \frac{a}{1 + \left(\left(\frac{1}{m} - 1\right) \cdot \frac{x}{(1-x)}\right)^{-\beta}}$$

By varying m, the midpoint of the curve can be adjusted; by varying a, the magnitude can be adjusted; and by varying beta β, the curvature may be adjusted. In some embodiments, having the midpoint to be half the grayscale image intensity and beta set to 2 may be found to provide optimal results. Intensities above the midpoint are scaled up and intensities below it are scaled down. In some cases, the activation function 510 is utilized because not all images have strong edge information and need to be enhanced to completely harness the BB effect. Adding this outline increases the perceptual contrast of the image. Any non-linear activation function that produces similar results can be used and is not limited to the equation mentioned above.

Figures 6, 7:
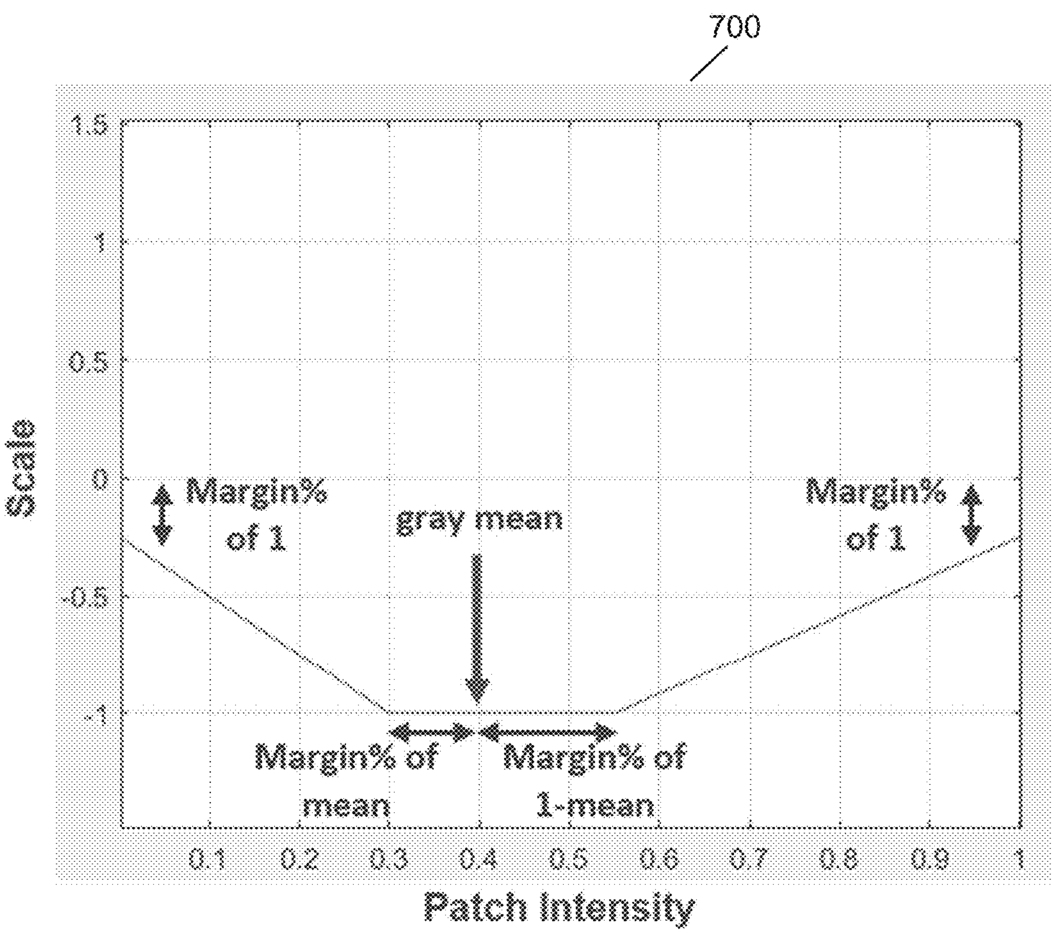
FIG. 6 illustrates an example of pseudocode for a gradient-to-outline (Grad2Outline) function, according to some embodiments.
FIG. 7 illustrates an example plot of patch intensity versus scale, according to some embodiments.

FIG. 6 illustrates an example of pseudocode for a Grad2Outline function, according to some embodiments. The value of the gradient by itself can be used as an outline. However, this may lead to many artifacts. Hence, the disclosed technology can utilize the Grad2Outline function, which takes in the gradient map of the image and outputs the outline. This outline is element-wise multiplied with input. Therefore, the outline may need to have values in the range [0, 1] where 1 does not make the pixel darker (no outline) and 0 makes the pixel darker (completely black). In one or more embodiments, the range of the outline can be restricted to be [0.9, 1] as a higher range leads to artifacts. The value of the outline can depend on the patch's intensity and its relation with the mean intensity of the grayscale image. This relation can be defined by a step function (similar to FIG. 7). The step function can return a value between [−high, 0] for darker than mean regions and [−low, 0] for lighter than mean regions. The returned value can act as a scale to the gradient (i, j) value, denoting how much of the gradient value at coordinate (i, j) may need to be as an outline depending on the patch intensity.

FIG. 7 denotes the step function which illustrates an example plot 700 of patch intensity versus scale, according to some embodiments. The x axis in the plot 700 denotes the patch intensity. The y axis shows the range of values from [−1, 0]. For x values>=gray mean (maxRGB mean), the range is scaled as [−low, 0] and for x values<gray mean, the range is scaled in the range of [−high, 0]. Margin is used to give an outline at the extreme intensities and around the mean gray intensity. In some embodiment, the margin can be set to 0.25 and provides optimal results. A margin of zero means that intensities 0 and 1 will have no outlines. A margin of 1 means that all the intensities will have the same weight outline.

Figure 8:
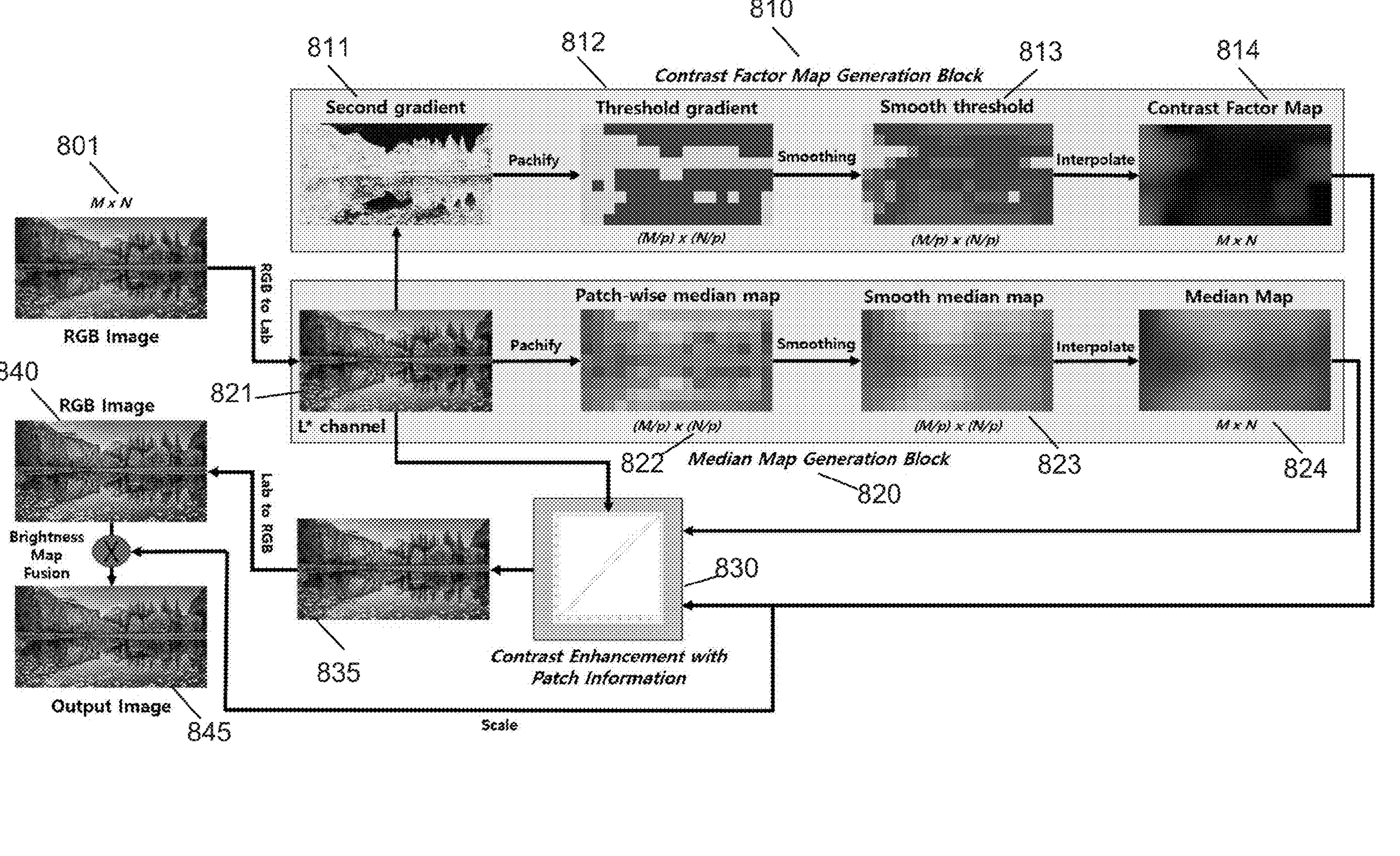
FIG. 8 illustrates a block diagram for final patch contrast enhancement, according to some embodiments.

FIG. 8 illustrates a block diagram for final patch contrast enhancement, according to some embodiments. In one or more embodiments, the RGB image 801 is provided to a median map generation processing block 820 to the L* (luminance) channel 821, where the L* channel image goes through a patchify process (converting the image into small patches) resulting in a patch-wise median map 822, after taking the median of each patch. The patch-wise median map 822 goes through a smoothing process resulting in a smooth median map 823 that goes through an interpolation operation resulting in the median map 824. For the contrast factor map generation processing block 810, the second gradient of L* (911) is used. The second gradient 811 image resulting from second gradient processing goes through a patchify process resulting in a threshold gradient 812, after thresholding each patch. The threshold gradient 812 goes through a smoothing process resulting in a smooth threshold image 813, which goes through an interpolation operation resulting in a contrast factor map 814. The L* channel image, the contrast factor map 814 and the median map 824 are provided to a contrast enhancement with patch information process 830 resulting in an enhanced image 835. The enhanced image 835 is provided to a Lab to RGB process resulting in an RGB image 840. The RGB image 840 and the contrast factor map 814 (that goes through a scale process) are fused with a brightness map fusion process to result in the output image 845.

In some embodiments, after outlining the image, a contrast correction can lead to making the highlights more evident. The contrast correction also adds a brightness map which highlights the foreground and models the BB effect further. After generation of the second gradient 811, the patchify process converts it into patches of size p×p. In some embodiments, a p equal to 240 may be used, but p can be varied based on the application and hardware capacity. A larger patch size causes more of a visual change to the image and has a lesser number of computations as the total number of patches in the whole image is inversely proportional to the patch size. However, this might lead to loss of detail as a bigger patch is not able to give more importance to each pixel. A smaller patch on the other hand can concentrate more on the patch, however, the visual change in the image is less. In addition, the total number of smaller patches is greater than that of the larger patches and requires more computations. After the patching processing, if the mean of the patch is greater than the median of the whole gradient, then that patch is assigned a contrast factor (e.g., 0.5). The other patches are assigned a fraction of the factor (e.g., 0.5*0.125=0.0625). A threshold gradient is generated in this processing. This means that the smooth areas in the image (which do not have more gradients) get less contrast enhancement. This is done to avoid enhancement of banding, which is predominant in smooth areas.

FIG. 9 illustrates an example pseudocode for smoothing of a threshold map (threshold gradient 812, FIG. 8), according to some embodiments. The threshold map is smoothened by the following. The processing includes a process that multiplies the negation of the threshold gradient and makes the edges smooth. If this processing is not performed, banding is introduced at high intensity changes in the image. For example, banding between a building and the sky. The smooth threshold map (after mean filtering) is then interpolated, from an interpolation process (the contrast factor map generation processing block 810, FIG. 8), bi-linearly to M×N. Each value denotes the contrast factor for that pixel based on the surrounding patches.

FIG. 10 illustrates an example pseudocode for enhancement of pixels in a channel based on the values from both a contrast factor map 814 (FIG. 8) and a median map 824 (FIG. 8), according to some embodiments. Median map 824 generation is similar to the contrast factor map 814 generation processing. The value assigned to each patch is the median of that patch. In one or more embodiments, the smoothing processing is a mean filtering operation on the (M/240)*(N/240) map because the median map 824 is relatively smoother than the contrast factor map 814 (as the latter requires thresholding) and does not require to be smoothened with its gradient at edges. The map is then interpolated bi-linearly to M×N. Each value denotes the median for that pixel based on the surrounding patches. Median map 824 generation is similar to the contrast factor map 814 generation processing. The final processing is to enhance all the pixels in the L* channel based on the values from both the contrast factor map 814 and median map 824. In some embodiments, the equation used is as follows:

$$f(x, w) = \frac{1}{1 + \left(\frac{1-x}{w \cdot x}\right)}$$

This function is used piecewise such that when x≥median, w=contrast and when x<median, w=−contrast. The processing pushes down the pixels below the median by a 'factor' and pushes up the pixels above the median by a 'factor' leading to an image with higher contrast.

Figure 11:
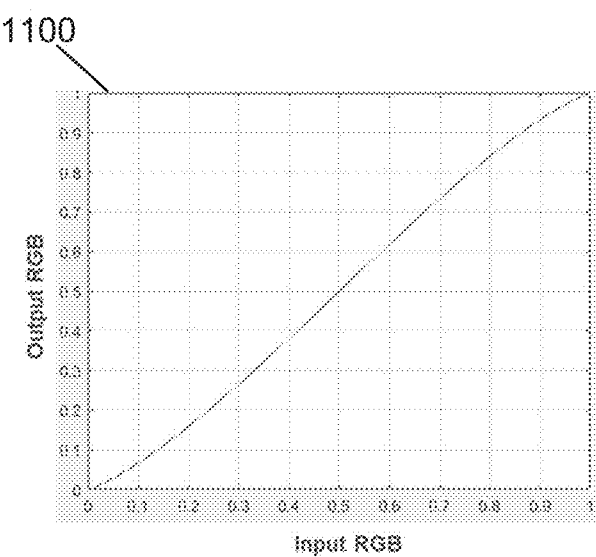
FIG. 11 illustrates an example enhancement curve, according to some embodiments.

FIG. 11 illustrates an example enhancement curve 1100, according to some embodiments. Any similar non-linear function can be used for this. After outlining the image, contrast correction can lead to making the highlights more evident, and also makes the effect of adding the brightness map (e.g., brightness map 1200, FIG. 12) more prominent.

Figure 12:
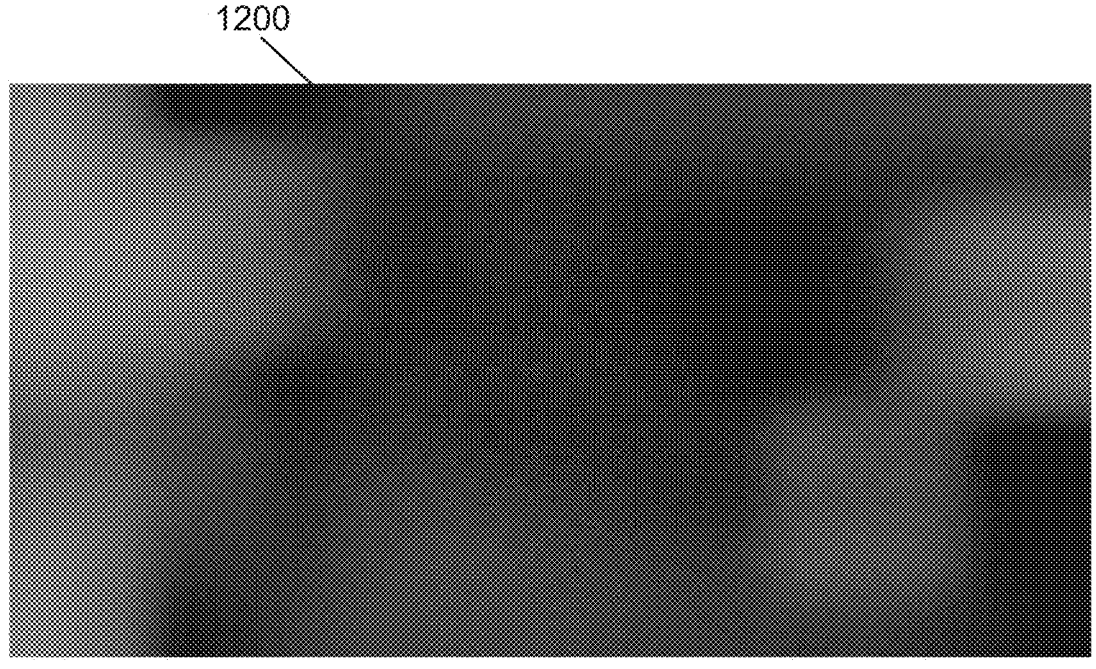
FIG. 12 illustrates an example brightness map, according to some embodiments.

FIG. 12 illustrates an example brightness map 1200, according to some embodiments. The contrast factor map 814 (FIG. 8), for example is created by having higher values as places with more detail and lower values with places with less detail. This can be used as a brightness map, which increases and decreases brightness of certain regions of the image to add more contrast. The contrast factor map 814 is scaled in the range of [0.95, 1], which means that the regions with higher details are kept the same and the other regions are made darker by 5%. Having a lower value in the lower limit leads to increased power saving. In addition to power saving, this also models an attribute of the BB effect, were the foreground appears to be brighter when the background is darker. The global contrast of the image is increased due to this.

Figure 13:
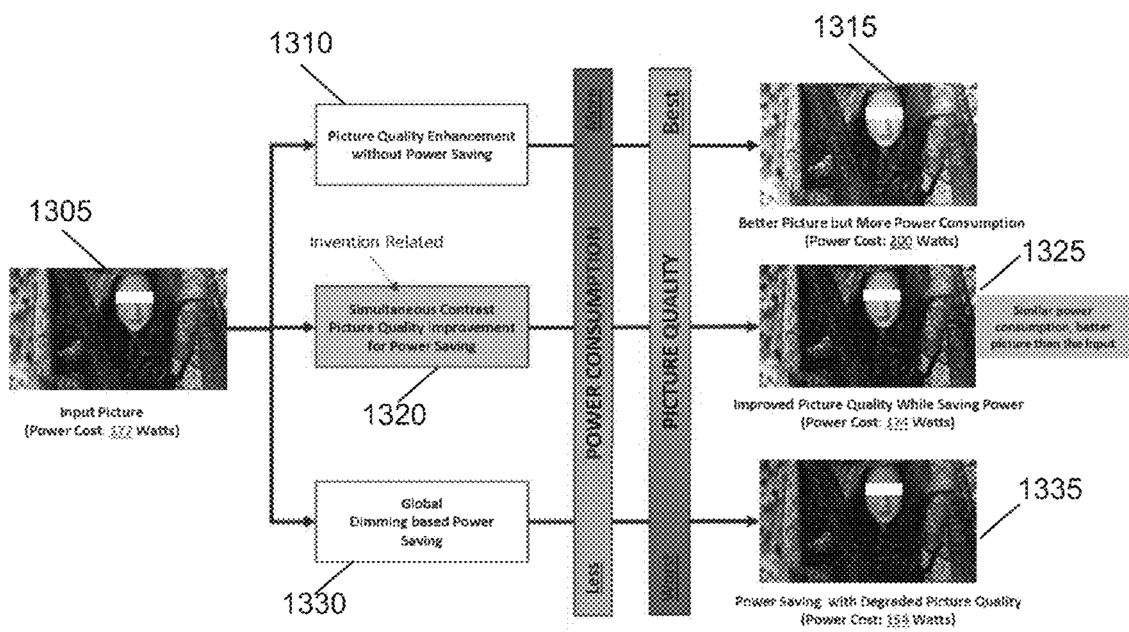
FIG. 13 illustrates an example of the disclosed technology use for improvement of PQ with similar power consumption, according to some embodiments.

FIG. 13 illustrates an example of the disclosed technology use for improvement of PQ with similar power consumption, according to some embodiments. The disclosed technology can be used for displays (e.g., televisions, smart phones, wearable devices, tablets, laptops, automotive displays, VR displays, AR displays, headset displays, digital cameras and camcorders, medical device displays, etc.) to show better PQ with more perceptible details and contrast without increasing power consumption. As shown for comparison, the input picture (image) 1305 (with example power cost of 177 Watts) is shown as being input to either PQ enhancement without power saving 1310, simultaneous contrast PQ improvement for power saving 1320 related to one or more embodiments, or global dimming-based power saving 1330. The vertical rectangle for power consumption shows more consumption to less consumption (top to bottom). The vertical rectangle for PQ shows best quality to worst quality (top to bottom). Image 1315 shows a better PQ but usage of more power consumption (example power cost of 200 Watts). Image 1325 shows an improved PQ while saving power consumption (example power cost of 174 Watts). Image 1325 has a similar power usage as input picture 1305 with a better PQ. Image 1335 shows power usage saving with a degraded PQ (example power cost of 154 Watts).

Figure 14:
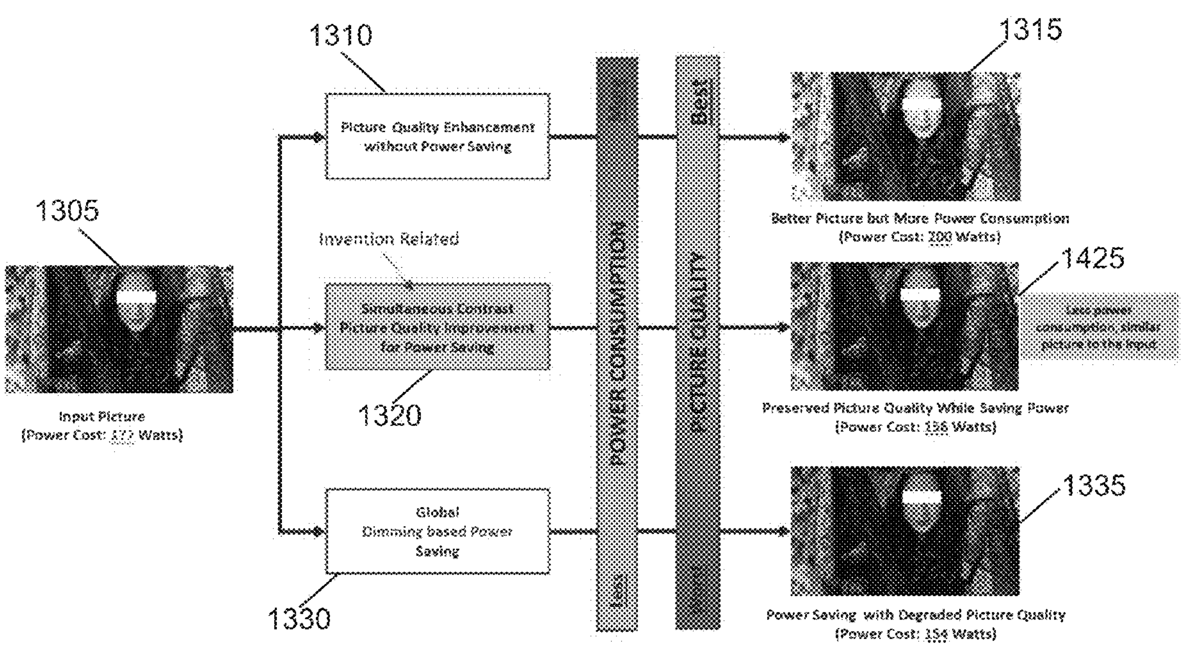
FIG. 14 illustrates an example of the disclosed technology use for preserving PQ with less power consumption, according to some embodiments.

FIG. 14 illustrates an example of the disclosed technology use for preserving PQ with less power consumption, according to some embodiments. The disclosed technology can be used for displays (e.g., televisions, smart phones, wearable devices, tablets, laptops, automotive displays, VR displays, AR displays, headset displays, digital cameras and camcorders, medical device displays, etc.) to save power with limited PQ degradation. As shown for comparison, the input picture (image) 1305 (with example power cost of 177 Watts) is shown as being input to either PQ enhancement without power saving 1310, simultaneous contrast PQ improvement for power saving 1320 related to one or more embodiments, or global dimming-based power saving 1330. The vertical rectangle for power consumption shows more consumption to less consumption (top to bottom). The vertical rectangle for PQ shows best quality to worst quality (top to bottom). Image 1315 shows a better PQ but usage of more power consumption (example power cost of 200 Watts). Image 1425 shows preserved PQ while saving power consumption (example power cost of 156 Watts). Image 1525 uses less power, but the PQ is similar to as image 1305. Image 1335 shows power usage saving with a degraded PQ (example power cost of 154 Watts).

Figure 15:
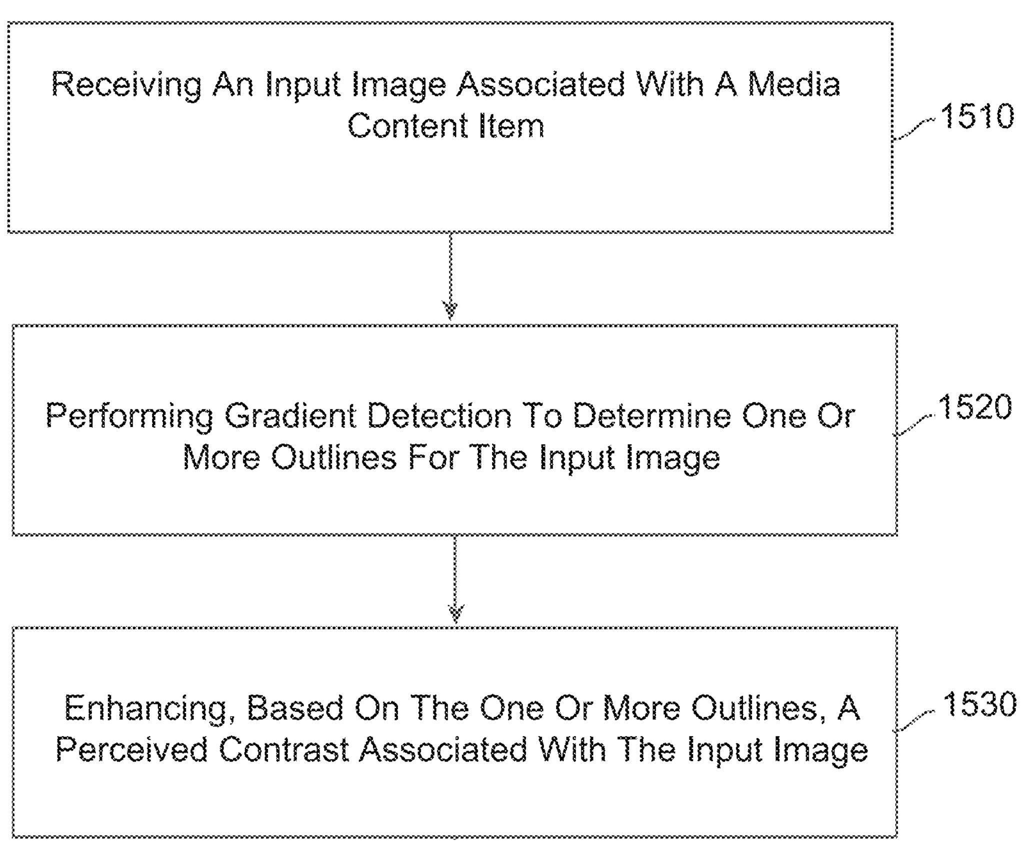
FIG. 15 illustrates a process for providing enhancement of perceived contrast associated with an input image, according to some embodiments.

FIG. 15 illustrates a process 1500 for providing enhancement of perceived contrast associated with an input image, according to some embodiments. In block 1510, process 1500 receives an input image associated with a media content item (e.g., video images, streamed images, etc.). In block 1520, process 1500 performs gradient detection to determine one or more outlines for the input image. In block 1530, process 1500 enhances, based on the one or more outlines, a perceived contrast associated with the input image.

In some embodiments, process 1500 further includes maintaining or reducing power consumption of a display device (e.g., televisions, smart phones, wearable devices, tablets, laptops, automotive displays, VR displays, AR displays, headset displays, digital cameras and camcorders, medical device displays, etc.) while enhancing the perceived contrast.

In one or more embodiments, process 1500 additionally includes providing a model (e.g., a computing model, machine learning model, etc.) for simultaneous contrast for PQ improvement based on outline-based enhancement and final contrast correction, while preserving or reducing power consumption of the display device.

In one or more embodiments, process 1500 provides the feature that enhancing perceived contrast associated with the input image is based on a BB effect.

In one or more embodiments, process 1500 further includes utilizing local median-based patch processing to improve the BB effect in an output image.

In one or more embodiments, process 1500 additionally provides computing a brightness map for the input image.

In some embodiments, process 1500 includes combining the brightness map with the input image to enhance a foreground of the input image relative to a background of the input image.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:

receiving an input image associated with a media content item;

performing gradient detection to determine one or more outlines for the input image; and enhancing, based on the one or more outlines, a perceived contrast associated with the input image, wherein enhancing the perceived contrast utilizes a local median-based patch processing to adjust one or more image attributes in an output image.

2. The method of claim 1, further comprising:

maintaining or reducing power consumption of a display device while enhancing the perceived contrast.

3. The method of claim 2, further comprising:

providing a model for simultaneous contrast for picture quality improvement based on outline-based enhancement and final contrast correction, while preserving or reducing power consumption of the display device.

4. The method of claim 1, wherein enhancing perceived contrast associated with the input image is based on a Bartleson-Breneman (BB) effect.

5. The method of claim 4, wherein utilizing the local median-based patch processing improves the BB effect in the output image.

6. The method of claim 1, further comprising:

computing a brightness map for the input image.

7. The method of claim 6, further comprising:

combining the brightness map with the input image to enhance a foreground of the input image relative to a background of the input image.

8. A non-transitory processor-readable medium that includes a program that when executed by a processor provides enhancement of perceived contrast associated with an input image, comprising:

receiving, by the processor, an input image associated with a media content item;

performing, by the processor, gradient detection to determine one or more outlines for the input image; and enhancing, by the processor, based on the one or more outlines, a perceived contrast associated with the input image, wherein enhancing the perceived contrast utilizes a local median-based patch processing to adjust one or more image attributes in an output image.

9. The non-transitory processor-readable medium of claim 8, further comprising:

maintaining or reducing power consumption of a display device while enhancing the perceived contrast.

10. The non-transitory processor-readable medium of claim 9, further comprising:

providing a model for simultaneous contrast for picture quality improvement based on outline-based enhancement and final contrast correction, while preserving or reducing power consumption of the display device.

11. The non-transitory processor-readable medium of claim 8, wherein enhancing perceived contrast associated with the input image is based on a Bartleson-Breneman (BB) effect.

12. The non-transitory processor-readable medium of claim 11, wherein utilizing the local median-based patch processing improves the BB effect in the output image.

13. The non-transitory processor-readable medium of claim 8, further comprising:

computing a brightness map for the input image.

14. The non-transitory processor-readable medium of claim 13, further comprising:

combining the brightness map with the input image to enhance a foreground of the input image relative to a background of the input image.

15. An apparatus comprising:

a memory storing instructions; and at least one processor executes the instructions including a process configured to:

receive an input image associated with a media content item;

perform gradient detection to determine one or more outlines for the input image; and enhance, based on the one or more outlines, a perceived contrast associated with the input image, wherein the process enhances the perceived contrast utilizing a local median-based patch processing to adjust one or more image attributes in an output image.

16. The apparatus of claim 15, wherein the process is further configured to:

maintain or reduce power consumption of a display device while enhancing the perceived contrast.

17. The apparatus of claim 15, wherein the process is further configured to:

provide a model for simultaneous contrast for picture quality improvement based on outline-based enhancement and final contrast correction, while preserving or reducing power consumption of the display device.

18. The apparatus of claim 15, wherein enhancing perceived contrast associated with the input image is based on a Bartleson-Breneman (BB) effect.

19. The apparatus of claim 18, wherein utilizing the local median-based patch processing improves the BB effect in the output image.

20. The apparatus of claim 15, wherein the process is further configured to:

compute a brightness map for the input image; and combine the brightness map with the input image to enhance a foreground of the input image relative to a background of the input image.

* * * * *